Patented Sept. 27, 1932

1,879,893

UNITED STATES PATENT OFFICE

FRANK J. DOBROVOLNY, OF NIAGARA FALLS, NEW YORK, ASSIGNOR, BY MESNE ASSIGNMENTS, TO THE ROESSLER AND HASSLACHER CHEMICAL COMPANY, OF NEW YORK, N. Y., A CORPORATION OF DELAWARE

REFRIGERATING COMPOSITION

No Drawing. Application filed February 10, 1930. Serial No. 427,424.

Methyl chloride, a widely used refrigerant, has the disadvantage that its mild odor, non-irritating properties and lack of color give little warning of leakage. Thus, in case of leakage from a large refrigerating system, relatively unsafe concentrations of methyl chloride in air may be formed before persons exposed are aware of its presence.

The object of this invention is to provide a refrigerant which gives warning of leakage and at the same time possesses the properties which make methyl chloride particularly suited for use as a refrigerant.

This is accomplished by incorporating in methyl chloride small proportions of chloropicrin, the vapor of which irritates the eyes and nose. I have found that mixtures containing 1% to 6% of chloropicrin give excellent warning of leakage and function as a refrigerant substantially as well as pure methyl chloride. However, this invention is not limited to these particular proportions as they may be varied. With such a mixture, persons exposed to concentrations of 0.1% by volume, or even less, of methyl chloride in air are quickly warned of its presence. The invention therefore provides a means for warning persons of concentrations of this substance which are far less than any which would endanger the health if exposure is limited to any reasonable time.

Substances having odorous or irritating properties have heretofore been incorporated with gases to give warning of leaks from containers other than refrigerating systems. Practically any stable irritant or odorant may be used for this purpose. However, for use in a refrigerating system, such a warning agent must possess special properties. I have found that chloropicrin has certain properties which make it an especially suitable warning agent when mixed with methyl chloride in a refrigerating system. It is not only a powerful irritant with an appreciable vapor pressure at room temperature, but also is soluble in methyl chloride, even at the low temperatures encountered in the refrigeration cycle, is stable under all conditions occurring in refrigerating systems, does not react with methyl chloride or the lubricating oil and, in the absence of moisture, has no corrosive action on metals used in refrigerator construction.

*Example.*—A compression-type household refrigerating machine was charged with methyl chloride containing about 2% by weight of chloropicrin, and put in operation. A measured quantity of methyl chloride vapor was then taken from the machine and discharged into a closed room so as to produce a concentration of about 0.1% by volume of methyl chloride in air. Persons subsequently entering the room experienced strong irritation of the eyes and nose within from 1 to 3 minutes.

I claim:

1. A composition of matter comprising a mixture of methyl chloride and warning amounts of chloropicrin.

2. A composition of matter comprising methyl chloride containing 1% to 6% by weight of chloropicrin.

3. A composition of matter comprising methyl chloride containing about 2% by weight of chloropicrin.

4. A composition of matter comprising substantially anhydrous methyl chloride containing about 2% by weight of chloropicrin.

Signed at Niagara Falls in the county of Niagara and State of New York this 3rd day of February A. D. 1930.

FRANK J. DOBROVOLNY.